United States Patent
Donnelly et al.

[11] Patent Number: 6,048,171
[45] Date of Patent: Apr. 11, 2000

[54] BLEED VALVE SYSTEM

[75] Inventors: Brian G. Donnelly, Suffield; Robert L. Gukeisen, Middletown; John S. Jenkins, Glastonbury, all of Conn.

[73] Assignee: United Technologies Corporation, Hartford, Conn.

[21] Appl. No.: 08/926,382

[22] Filed: Sep. 9, 1997

[51] Int. Cl.[7] .................................................. F01B 25/00
[52] U.S. Cl. ...................... 415/145; 60/226.3; 60/39.07; 137/601
[58] Field of Search .................................... 415/145, 144, 415/28, 148, 150, 151, 159, 160; 60/226.3, 39.07; 137/862, 875, 601

[56] References Cited

U.S. PATENT DOCUMENTS

| | | |
|---|---|---|
| 2,850,227 | 9/1958 | Wheatley . |
| 2,994,193 | 8/1961 | Friedmann . |
| 3,030,006 | 4/1962 | Shoup, Jr. . |
| 3,057,541 | 10/1962 | Hasbrouck et al. . |
| 3,094,270 | 6/1963 | Kent et al. . |
| 3,108,767 | 10/1963 | Eltis et al. . |
| 3,588,268 | 6/1971 | Hampton . |
| 3,638,428 | 2/1972 | Shipley et al. . |
| 3,898,799 | 8/1975 | Pollert et al. . |
| 4,060,981 | 12/1977 | Hampton . |
| 4,344,282 | 8/1982 | Anders . |
| 4,715,779 | 12/1987 | Suciu . |
| 4,823,748 | 4/1989 | Ampferer et al. . |
| 4,827,713 | 5/1989 | Peterson et al. . |
| 5,048,286 | 9/1991 | Stransky et al. ........................ 60/226.3 |
| 5,054,286 | 10/1991 | Stransky et al. ........................ 60/226.3 |
| 5,113,649 | 5/1992 | Siedlecki, Jr. ........................... 60/226.3 |
| 5,380,151 | 1/1995 | Kostka et al. . |

FOREIGN PATENT DOCUMENTS

| | | | |
|---|---|---|---|
| 2027813A | 2/1980 | United Kingdom .................. | 60/226.3 |

OTHER PUBLICATIONS

General Electric CF6–80C2 Engine cutaway illustration excerpted from Flight International, May 23, 1987, pp. 30–31.

*Primary Examiner*—F. Daniel Lopez
*Assistant Examiner*—Matthew T. Shanley
*Attorney, Agent, or Firm*—Kenneth C. Baran

[57] ABSTRACT

The invention is a valve system particularly useful as a bleed valve system in a gas turbine engine. The valve system includes a valve ring or partition (44) that bounds a plenum (52). The valve ring has a set of two or more fluid flow regulating apertures (46), and one or more chains (60L, 60R) of metering plates (56). Each metering plate is pivotably supported relative to one of the apertures (46) to regulate fluid flow through the aperture. A coupling system that includes a series of transfer links (76) extending between neighboring metering plates successively conveys pivotal motion and angular orientation from each metering plate to the successive metering plate in the chain. An actuation system (90) includes a drive system (94) responsive to an actuator (92) for governing the angular orientation of the metering plates.

11 Claims, 6 Drawing Sheets

BLEED VALVE SYSTEM

TECHNICAL FIELD

This invention relates to valve systems for regulating fluid flow from a plenum, and particularly to a bleed valve system for diverting a working medium gas from a flowpath in a gas turbine engine.

BACKGROUND OF THE INVENTION

Gas turbine engines, such as those used for aircraft propulsion, typically include a bleed valve arrangement for diverting pressurized working medium fluid from a main flowpath. One common use of such a valve arrangement is to channel fluid, as necessary, from the engine's primary flowpath to a coannular secondary flowpath to temporarily improve the aerodynamic stability of the engine's compression system.

One general type of bleed valve arrangement is exemplified by U.S. Pat. Nos. 4,715,779 to Suciu (assigned to United Technologies Corporation, the assignee of the present application) and 3,638,428 to Shipley et al. In those arrangements the upstream edges of a series of circumferentially distributed doors are pivotably hinged to a frame, and a mechanical linkage extends from each door to a unison ring. Actuating means such as a mechanical actuator or a hydraulic motor are provided to displace the unison ring circumferentially thereby opening or closing the doors in parallel. However actuation forces can cause the unison rings or mechanical linkages to elastically deflect thereby compromising the capability to accurately position the doors. The unison rings are also susceptible to binding, especially if they become distorted as a result of nonuniform thermal expansion or aircraft maneuver loads. Moreover, net fluid pressure acting against each door produces a moment about the door hinge that must be overcome by the actuating system. Since the magnitude of the moment can be considerable, the actuating system components must be correspondingly bulky and heavy—characteristics that are clearly undesirable in aircraft engines.

Another type of widely used bleed valve arrangement is described in U.S. Pat. No. 4,827,713 issued to Peterson et al. and also assigned to United Technologies Corporation. In the disclosed arrangement, a valve ring is guided in a spiral motion between longitudinally spaced apart open and closed positions thereby controlling the flow of working medium gas through an array of circumferentially distributed passages. In the closed position, a pair of surfaces on the valve ring engages a corresponding pair of resilient seals to minimize leakage through the passages. Despite the many merits of this arrangement, deterioration and wear gradually degrade the effectiveness of the seals and diminish engine efficiency. Moreover, many of the components of the valve assembly are not readily accessible for repair or replacement without substantial engine disassembly.

The above described bleed valve arrangements may also not be readily adaptable to the newest generation of large diameter, high thrust turbine engines. These newer generation engines operate at higher pressures and temperatures than their older generation counterparts. The higher pressures would amplify the pressure induced moment about the door hinges of the arrangements attributable to Suciu and to Shipley et al., and the higher temperatures would lead to markedly accelerated deterioration of the resilient seals used in the bleed valve attributable to Peterson, et al.

SUMMARY OF THE INVENTION

It is, therefore, an object of the invention to provide a valve system that can be operated without potentially troublesome unison rings and that does not require a heavy, bulky actuation system.

It is a further object of the invention to provide a valve system that does not rely on deterioration prone resilient seals, and whose components are readily accessible without substantial disassembly of the engine.

It is a further object of the invention to provide a bleed valve system that is tolerant of the higher pressures and temperatures characteristic of newer generation turbine engines.

According to the invention, a valve system for regulating fluid flow through a set of apertures includes a chain of successively coupled metering plates, each of which is pivotably supported to cooperate with one of the apertures, and an actuation system that governs the angular orientation of one of the metering plates in the chain, thereby establishing the angular orientation of the remaining metering plates in the chain.

According to one aspect of the invention, the metering plates are successively coupled together by rotary transfer links that extend between neighboring metering plates and are connected to the plates by universal joints or other compliant connectors. The angular orientation of one of the metering plates in the chain is successively transferred to the other plates in the chain by way of the transfer links.

In one embodiment of the invention, the metering plates are supported by trunnions situated so that fluid pressure acting on the plates produces a moment about the trunnions that gently biases the plates toward a preferred orientation. The gentle bias failsafes the valve system in a preferred direction without imposing undue burdens on the actuation system during normal operation. In another embodiment, the plates are aerodynamically contoured to compensate for a reduction in the orienting moment that occurs as the metering plates pivot toward their open orientation.

The invention is advantageous in several respects. Since the metering plates are successively coupled together rather than connected in parallel by a unison ring, the difficulties (e.g. binding) that accompany the use of unison rings are avoided. Moreover, the successively coupled metering plates can be accurately oriented, and therefore are capable of minimizing leakage through the flow regulating apertures without the assistance of trouble prone resilient seals. Because the metering plate trunnions are situated to produce no more than a gentle failsafing moment about the pivotable supports, the actuation system can be made correspondingly light and compact. Finally, when the valve system is used as a bleed valve system in a turbine engine, many of the valve system components are readily accessible and replaceable without significant disassembly of the engine. Moreover, the valve system is suitable for use at the higher pressures characteristic of newer generation turbine engines.

The foregoing features and advantages and the operation of the invention will become more apparent in light of the following description of the best mode for carrying out the invention and the accompanying drawings.

BEST MODE FOR CARRYING OUT THE INVENTION

Figure 1:
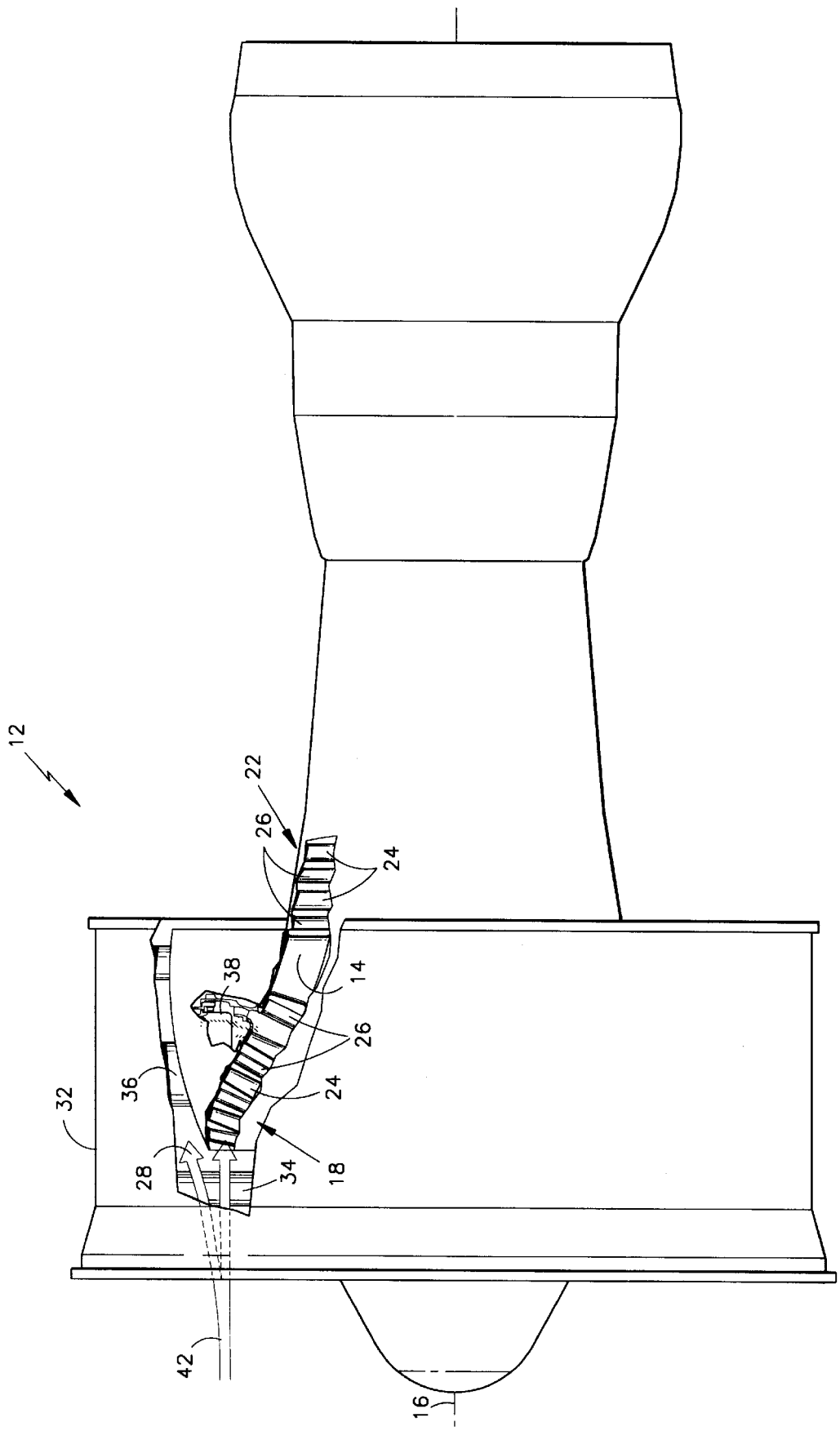
FIG. 1 is a side view of a typical turbofan gas turbine engine with a portion of the engine case broken away to expose selected internal features.

Referring to FIG. 1, a turbofan gas turbine engine 12 of the type commonly used for aircraft propulsion includes a primary flowpath 14 annularly disposed about a longitudinally extending central axis 16. The engine has a low pressure compressor 18 and a high pressure compressor 22 each of which includes multiple arrays of blades 24 and vanes 26 that extend radially across the primary flowpath. The engine also includes a secondary flowpath 28, coannular with the primary flowpath. A fan 32 comprises arrays of fan blades 34 and fan stator vanes 36 that extend radially across the secondary flowpath. A circumferentially extending annulus 38 is situated radially intermediate the primary and secondary flowpaths.

During engine operation, a working medium gas 42 flows longitudinally through the flowpaths and is compressed by the fan and compressors Under some engine operating conditions, it is desirable to temporarily divert a portion of the working medium gas out of the primary flowpath and into the secondary flowpath by way of annulus 38 to improve the aerodynamic stability of the low pressure compressor. A bleed valve arrangement is used to selectively regulate the flow of gas from the primary flowpath.

Referring now to FIGS. 2 through 6, an improved valve system for regulating fluid flow from the primary flowpath 14 is illustrated. A partition 44 having a set of two or more flow regulating apertures 46, each bordered by a frame 48, defines the radially outer boundary of a plenum 52. The plenum is in flow communication with the primary flowpath 14 by virtue of a series of circumferentially distributed bleed ports 54. A plurality of metering plates, generically designated 56 and individually designated 56a through 56h, are pivotably supported from the frame. As described more completely hereinafter, the metering plates cooperate with the flow regulating apertures to regulate fluid flow therethrough. An optional porous screen, 58 prevents foreign objects from entering the primary flowpath by way of the apertures and plenum. As seen best in FIG. 4, the partition 44 is a circumferentially closed valve ring that defines the radially outermost perimeter of the plenum, and the metering plates are coupled together into one or more chains of metering plates with each metering plate being a member of one of the chains. In the illustrated embodiment, the metering plates are organized into two circumferentially oppositely extending chains—chain 60L including metering plates 56a through 56d, and chain 60R including metering plates 56e through 56h.

Figure 2:
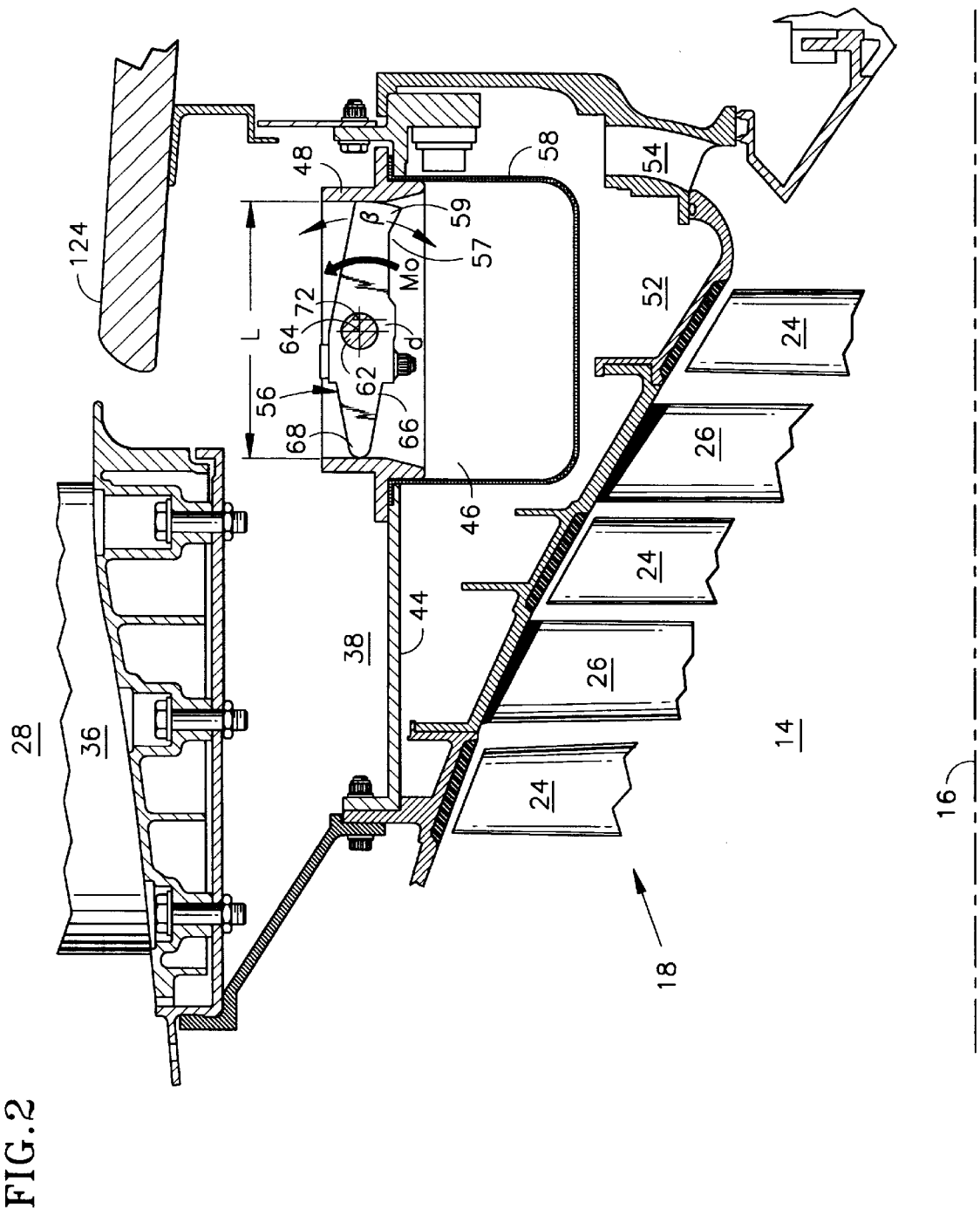
FIG. 2 is an enlarged view of a portion of FIG. 1 showing a valve system according to the present invention with a metering plate in its fully closed orientation.
Figure 3:
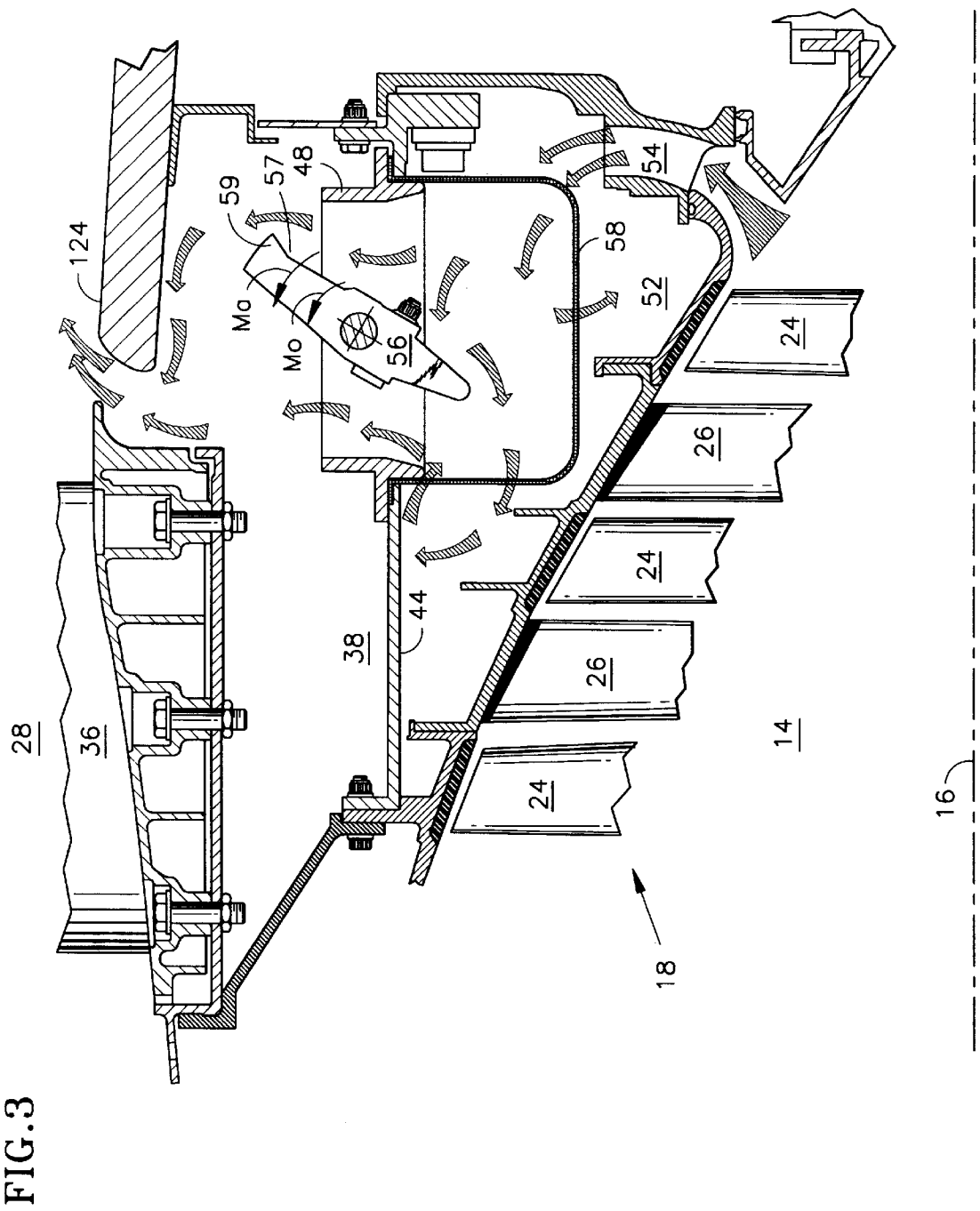
FIG. 3 is a view similar to that of FIG. 2 showing the metering plate in an open orientation and illustrating the fluid flow patterns in the vicinity of the metering plate.
Figure 4:
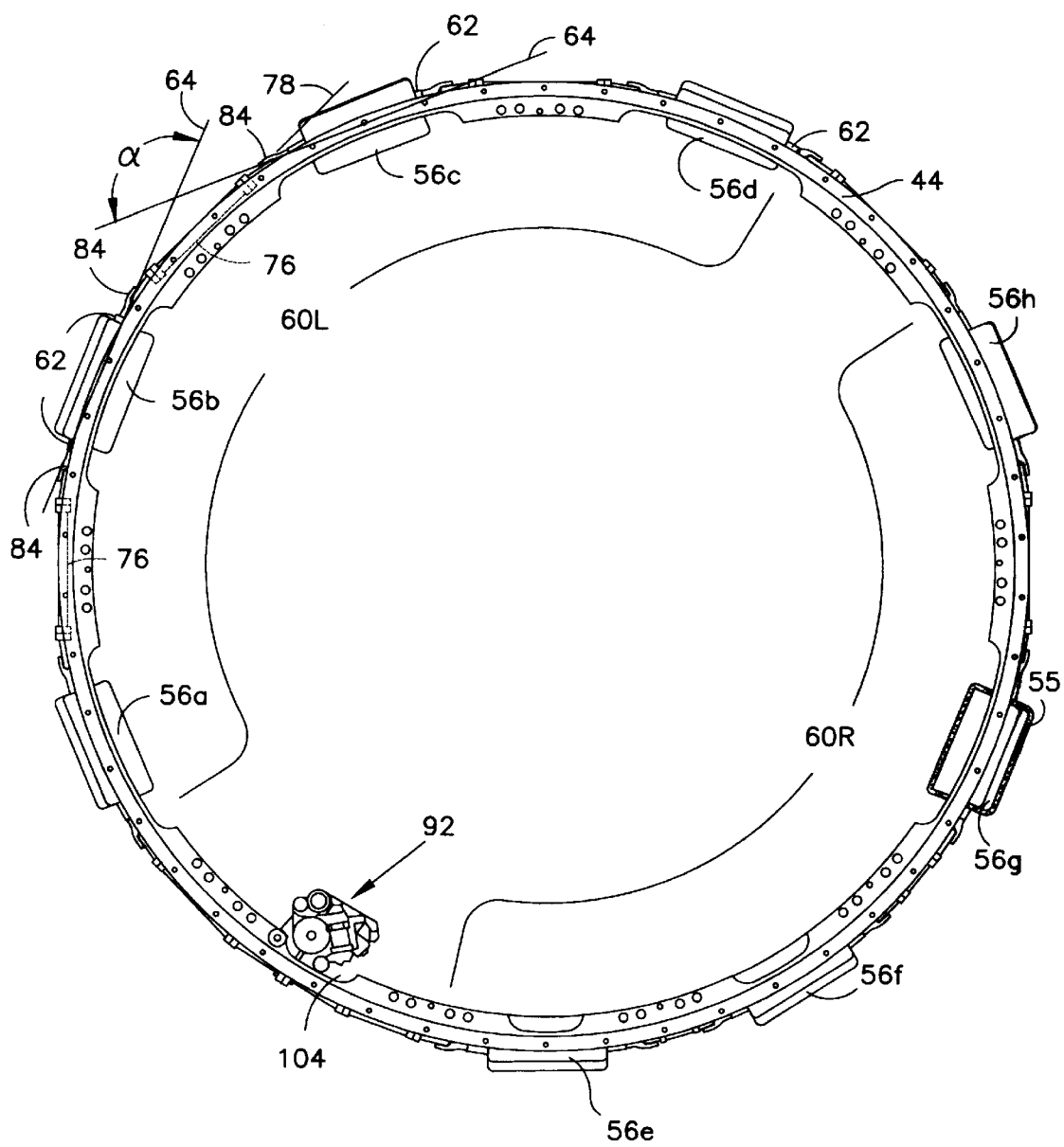
FIG. 4 is a longitudinal view of the valve system, as seen looking forwardly, illustrating a set of fluid flow regulating apertures, and two chains of metering plates for regulating fluid flow through the apertures.
Figure 5:
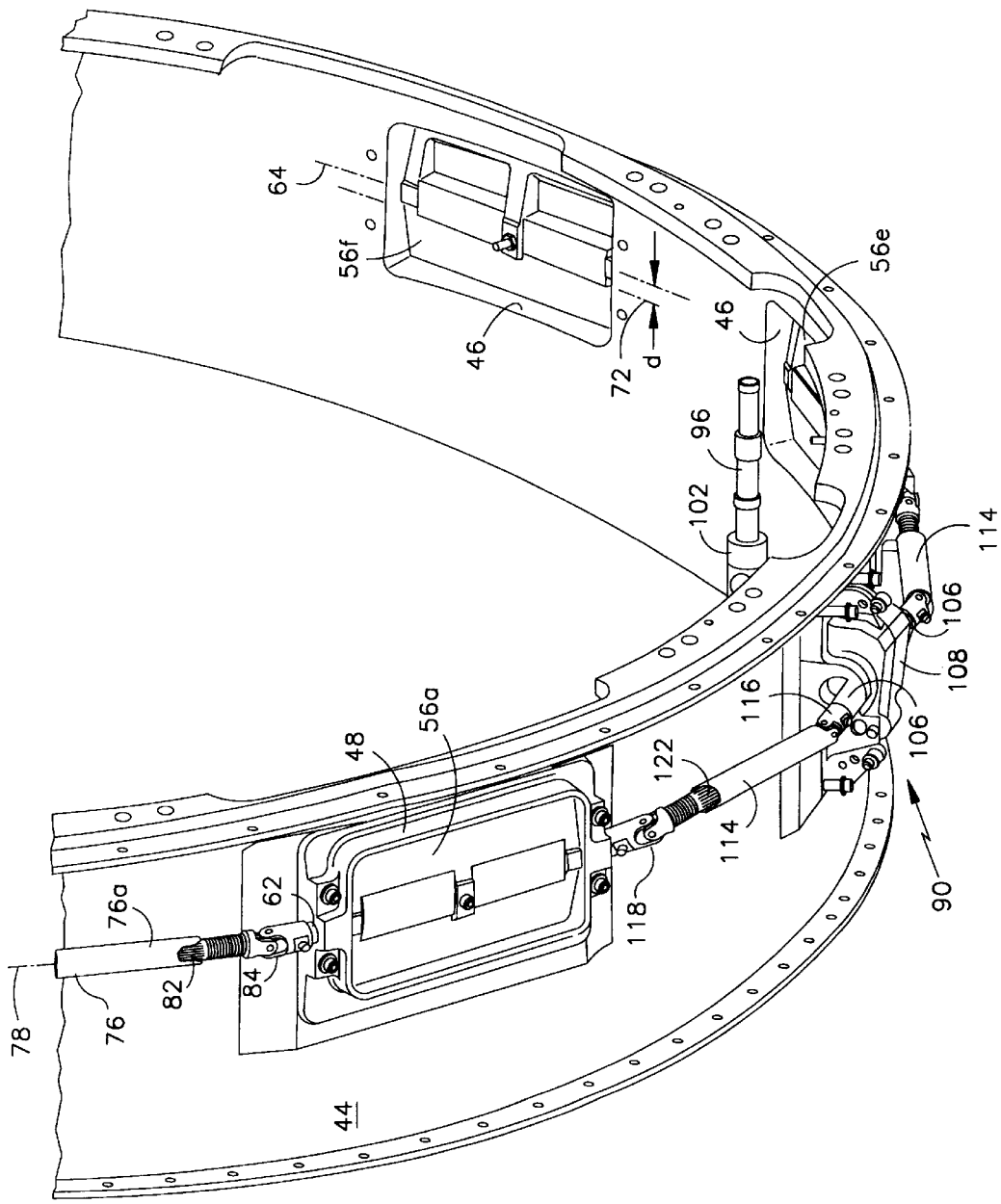
FIG. 5 is a perspective view of a portion of the valve system of FIGS. 2 and 4.

The metering plates are supported on the frame 48 by trunnions 62 so that each plate is pivotable about a trunnion axis 64 between an open orientation (FIGS. 3, 4) and a closed orientation (FIGS. 2, 5) so that fluid flow through the apertures may be regulated. If desired, a nonmetallic or metallic seal, such as seal 55 that borders the perimeter of metering plate 56g (FIG. 4), may be provided to inhibit fluid leakage through the apertures when the metering plates are in the closed orientation. However in the preferred embodiment, such seals are considered unnecessary. Each metering plate is configured so that an orienting moment $M_o$ arising from unequal fluid pressure acting against radially inner and outer surfaces 66, 68 tends to pivot each plate away from its closed orientation and toward its open orientation. For example, the areas of surfaces 66, 68 may be distributed relative to the trunnion axis so that the resultant force acts behind the trunnion axis (i.e. to the right of the axis as seen in FIG. 2) thereby producing the illustrated counterclockwise moment. In the illustrated embodiment, the orienting moment is produced primarily as the result of the trunnion axis being longitudially offset by a small distance d from laterally extending aperture centerline 72 (for illustrative clarity, the distance d is exaggerated in FIGS. 2 and 5; in practice, d is approximately 0.050 inches (1.3 millimeters) or about 1% of the length L of a typical aperture). Regardless of how the orienting moment is produced, it should be large enough to urge the plates toward their open orientation, but small enough that an actuation system 90, which must overcome the moment during operation of the valve system, is not unduly burdened.

The metering plates of each chain are successively coupled together by a coupling system that includes a transfer link 76 extending between neighboring metering plates. Each transfer link is rotatable about a rotational axis such as representative axis 78, and comprises an assembly of telescoping sublinks, 76a and 76b, coupled together by a spline connection 82. The spline connection ensures that the two sublinks are corotatable while also being free to undergo slight relative movement parallel to the rotational axis 78 to accommodate thermal expansion and contraction of the valve ring 44. The ends of each transfer link 76 are connected to adjacent metering plate trunnions 62 by a compliant connector, such as a universal joint 84, capable of conveying rotary motion and angular orientation between the metering plates despite the angular offset a between the trunnion axes 64.

Figure 6:
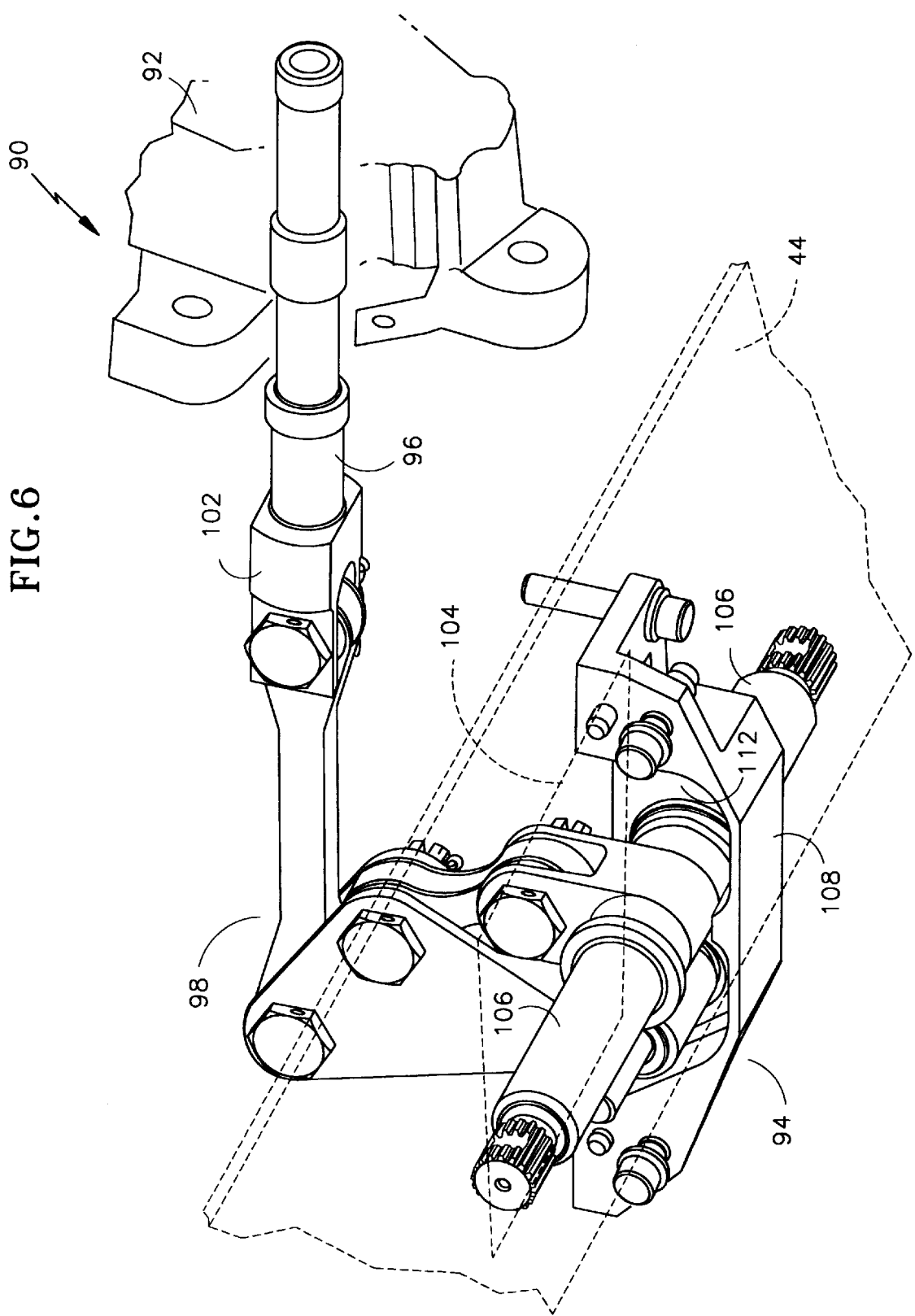
FIG. 6 is a perspective view of a linkage for converting the linear output of a hydraulic actuator to an angular orientation of a valve system drive link.

The actuation system 90 governs the angular orientation β of the metering plates. The actuation system comprises an actuator 92 (FIGS. 4, 6) and a drive system 94. The illustrated actuator is a conventional hydraulic actuator having a substantially linear output effected by a longitudinally extensible pushrod 96. The drive system comprises a drive mechanism 98, connected to the actuator pushrod by a clevis 102. The drive mechanism extends radially through an opening 104 in the valve ring 44 and also includes a pair of drive shafts 106. A substantially fluid-tight two piece cover 108 (only one piece of which is shown in FIG. 6) is bolted to the valve ring to contain fluid that would otherwise leak from the plenum and into the secondary flowpath through the opening 104. The drive shafts 106 project laterally through sidewalls 112 of the cover. The drive system also includes a pair of drive links 114. One end of each drive link is coupled to the exposed end of one of the drive shafts by a universal joint 116, and the other end of each drive link is coupled to a metering plate trunnion by a similar universal joint 118. The drive links, like the transfer links, are a pair of telescoping sublinks coupled together by a spline connection 122.

In normal operation, the linkage of drive mechanism 98 converts the linear output of the actuator to an angular orientation of the drive link. The drive link orientation is transferred to one of the metering plates of each metering plate chain, for example to plate 56a of chain 60L. This orientation is transferred successively along each chain from plate to plate (e.g. from plate 56a to plate 56b; from plate 56b to plate 56c, and from plate 56c to plate 56d) by rotary motion of the transfer links 76 about their respective axes 78. The drive system thus governs the angular orientation of the metering plates in response to the output of the actuator 92. The orientation of the metering plates, in turn, regulates fluid flow through the apertures. Because the magnitude of the orienting moment $M_o$ is modest, the actuator, which must overcome any moments imposed on the metering plates, can be made light and compact.

In the event that a drive shaft, a drive link or a transfer link breaks, one or more metering plates will be rendered nonresponsive to the actuation system. However the moment $M_o$ arising from the offset distance d will urge the affected metering plates toward their open orientation thereby ensuring compression system stability until the broken link can be replaced. As each metering plate pivots from a closed orientation toward its open orientation, the fluid pressure differential acting against metering plate surfaces 66, 68 becomes less pronounced and, consequently, the orienting moment $M_o$ diminishes. Therefore, each metering plate is aerodynamically contoured so that fluid flow around the plates (as by the interrupted flow arrows in FIG. 3) produces a compensatory moment $M_a$ that reinforces the diminishing orienting moment $M_o$. In the illustrated embodiment, the aerodynamic contouring is achieved by means of a depression 57 and spoiler 59 that turn the fluid stream to impose a reaction force against metering plate surface 66. Depending on the specific fluid flow patterns and pressure distribution in the vicinity of the metering plate, other suitable aerodynamic shapes may also be employed.

The valve system according to the invention is advantageous in many respects. Unlike the arrangement shown in the 4,827,713 patent to Peterson et al., replacement of faulty or worn valve system components can be carried out without significant disassembly of the engine. The transfer links, metering plates and many elements of the drive mechanism, including the drive links, are readily accessible upon removal of one or more access panels 124 at the radially inner boundary of the secondary flowpath.

The valve system of the present invention also avoids the problems inherent in valve arrangements that rely on a supervisory member such as a unison ring to exercise parallel control over one or more fluid flow regulating passages. These problems include valve positioning inaccuracies and unison ring binding due to mechanical and thermal distortion of the ring. By contrast, the metering plates of the present invention are successively actuated through a set of rotatable drive and transfer links that are largely resistant to binding. Mechanical and thermal distortions are accommodated by the universal joints and spline connections. Moreover, the valve system is capable of orienting the metering plates with a high degree of accuracy so that the potentially troublesome seals, such as seal 55 or the resilient seals evident in some prior art designs, can be dispensed with if desired. In addition, the longitudinal offset between the trunnion axis and the aperture centerline helps to minimize actuator size and weight while ensuring that the metering plates are biased toward the open orientation.

The invention is not limited to the above described embodiment. For example, the plenum boundary of the illustrated embodiment is a circumferentially extending ring radially intermediate a pair of coannular flowpaths in a gas turbine engine. However the valve system may be employed in products other than gas turbine engines, and may be used with a plenum boundary that extends linearly rather than arcuately. The valve system as presented envisions a set of metering plates whose angular orientations are substantially equal throughout their entire range of motion. However the valve system may also include means for nonuniformly orienting the metering plates in the event that nonuniform diversion of fluid from the plenum is desired. These and other changes, modifications and adaptations can be made without departing from the invention as set forth in the accompanying claims.

We claim:

1. A valve system for regulating fluid flow from a plenum, comprising:
   a partition having a set of flow regulating apertures therein, the partition forming a boundary of the plenum;
   a plurality of pivotably supported metering plates, each metering plate cooperating with one of the flow regulating apertures to regulate fluid flow therethrough;
   a coupling system successively coupling together the metering plates to form one or more chains of metering plates, each metering plate being a member of one of the chains; and
   an actuation system for governing the angular orientation of the metering plate members of each chain.

2. The valve system of claim 1 wherein the coupling system comprises a transfer link extending between neighboring metering plates, each end of the transfer link being connected to a corresponding metering plate trunnion by a compliant connector.

3. The valve system of claim 2, wherein the compliant connector is a universal joint.

4. The valve system of claim 2 wherein each transfer link has a rotational axis and comprises a telescoping assembly of sublinks, the sublinks being corotatably coupled together and axially translatable with respect to each other.

5. The valve system of claim 1 wherein the actuation system comprises an actuator having a substantially linear output and a drive system responsive to the actuator output for governing the angular orientation of the metering plates.

6. The valve system of claim 5 wherein the drive system comprises a drive mechanism connected to the actuator and a drive link extending from the drive mechanism to a metering plate trunnion.

7. The valve system of claim 1 wherein the partition is a circumferentially closed ring forming a perimeter of the plenum.

8. The valve system of claim 1 wherein the metering plates have an open orientation and a closed orientation and are configured so that an orienting moment tends to pivot each plate away from its closed orientation and toward its open orientation.

9. The valve system of claim 8 wherein the metering plates are aerodynamically contoured to reinforce the orienting moment.

10. A bleed valve system for regulating fluid flow from a plenum in a turbine engine, comprising:
   a ring circumscribing the plenum and having a set of circumferentially distributed flow regulating apertures therein, the ring forming a boundary of the plenum;
   two circumferentially oppositely extending chains of pivotably supported metering plates, each metering plate being a member of one of the chains and cooperating with one of the flow regulating apertures to regulate fluid flow therethrough;
   an actuation system comprising an actuator having a substantially linear output, a drive mechanism responsive to the actuator output and a pair of rotatable drive links responsive to the drive mechanism, each drive link extending from the drive mechanism to one of the metering plate chains; and a set of transfer links extending between the metering plate members of each chain for successively coupling the members together.

11. The bleed valve system of claim 10, wherein the metering plates are supported on trunnions and each metering plate has an open orientation and a closed orientation and the trunnions are situated so that fluid pressure acting on the metering plates imposes an orienting moment about the trunnions that biases the metering plates toward the open orientation, and the metering plates are aerodynamically contoured to reinforce the orienting moment.

* * * * *